(12) United States Patent
Izawa et al.

(10) Patent No.: US 12,287,492 B2
(45) Date of Patent: Apr. 29, 2025

(54) LIGHT FLUX CONTROLLING MEMBER AND METAL MOLD

(71) Applicant: Enplas Corporation, Saitama (JP)

(72) Inventors: Takahiro Izawa, Saitama (JP); Satoshi Oshima, Saitama (JP)

(73) Assignee: Enplas Corporation, Saitama (JP)

( * ) Notice: Subject to any disclaimer, the term of this patent is extended or adjusted under 35 U.S.C. 154(b) by 502 days.

(21) Appl. No.: 17/817,773

(22) Filed: Aug. 5, 2022

(65) Prior Publication Data

US 2024/0045116 A1    Feb. 8, 2024

(51) Int. Cl.
*G02B 3/08*    (2006.01)
*G02B 6/42*    (2006.01)

(52) U.S. Cl.
CPC ............. *G02B 3/08* (2013.01); *G02B 6/4206* (2013.01)

(58) Field of Classification Search
CPC ....................................................... G02B 3/08
See application file for complete search history.

(56) References Cited

U.S. PATENT DOCUMENTS

| 2019/0339423 | A1* | 11/2019 | Tsunetomo | ...... | B29D 11/00442 |
| 2019/0391337 | A1* | 12/2019 | Sato | ................. | B29D 11/00442 |
| 2020/0064568 | A1 | 2/2020 | Tsunetomo | | |
| 2022/0410512 | A1* | 12/2022 | Yoneyama | ....... | B29D 11/00307 |

FOREIGN PATENT DOCUMENTS

| WO | 2018163936 A1 | 9/2018 |
| WO | 2018198511 A1 | 11/2018 |

* cited by examiner

*Primary Examiner* — Edmond C Lau
(74) *Attorney, Agent, or Firm* — Shih IP Law Group, PLLC

(57) ABSTRACT

The present invention provides a light flux controlling member that can determine the center of a lens surface (light flux control surface) that does not have a circular outer edge in plan view. A light flux controlling member of the present invention includes: a light flux control surface including an outer edge with a shape that is drawn by a point A when a straight line connecting a point O and the point A is rotated 360 degrees or more clockwise or counterclockwise around the point O while a length of the straight line is gradually increased in plan view; and a center determination mark disposed outside of the light flux control surface and on a circle around the point O in plan view.

9 Claims, 2 Drawing Sheets

LIGHT FLUX CONTROLLING MEMBER AND METAL MOLD

TECHNICAL FIELD

The present invention relates to a light flux controlling member and a metal mold.

BACKGROUND ART

In recent years, communication devices and systems equipped with multimode fibers have been used to transmit and receive large amounts of data at high speeds using optical communications. Multimode fibers can pass more light than single-mode fibers because the diameter of the core through which light passes is larger. However, the propagation speed of light differs for each mode due to the passage of light in many modes, resulting in light dispersion (differential modal dispersion (DMD)), which degrades light waveforms. This problem is particularly problematic in multimode fibers when the refractive index distribution in the center of the core is unstable.

As a means to improve this problem, it is known to use optical elements called vortex lenses or vortex phase plates. A vortex lens (vortex phase plate) is an optical element (light flux control component) with a surface (vortex surface) having a continuous or stepwise spiral shape. When light with a Gaussian distribution with high intensity in the central part is passed through a vortex lens, it is converted into light with a ring-shaped intensity distribution, in which the intensity in the central part is significantly reduced.

When light converted to a ring-shaped intensity distribution by the vortex lens is entered into a multimode fiber, the effect of the refractive index distribution at the center of the core is suppressed, and light of higher-order modes becomes predominant, thus suppressing degradation of the light waveform.

For example, PTL 1 discloses an optical component with a lens in which a vortex shape is formed. According to PTL 1, with the optical component, it is possible to enter light with a ring-shaped intensity distribution in which the intensity in the central part is reduced into a multimode fiber. In addition, forming a vortex shape on the surface of the lens and integrating these components makes it easier to adjust the optical axis.

PTL 2 discloses an optical communication device with an optical transmitter equipped with a transmitter side vortex optical element placed between a light source and a multimode fiber, and an optical receiver equipped with a receiver side vortex optical element placed between a multimode fiber and a light receiving element. According to PTL 2, by providing the optical transmitter and optical receiver with vortex optical elements which provide respective phase differences in the direction opposite to the rotation direction of the light wavefront, both suppression of DMD and improvement of light receiving efficiency are achieved.

CITATION LIST

Patent Literature

PTL 1
WO2018/163936
PTL 2
WO2018/198511

SUMMARY OF INVENTION

Technical Problem

The above-described vortex lens surfaces include lens surfaces whose outer edges are not circular when viewed in plan view. For such lens surfaces, it is not possible to determine the center position of the lens surface (light flux control surface) from its outer shape.

An object of the present invention is to provide a light flux controlling member that can determine the center of a lens surface (light flux control surface) that does not have a circular outer edge in plan view. In addition, another object of the present invention is to provide a metal mold that can mold the light flux controlling member.

Solution to Problem

A light flux controlling member according to an embodiment of the present invention includes: a light flux control surface including an outer edge with a shape that is drawn by a point A when a straight line connecting a point O and the point A is rotated 360 degrees or more clockwise or counterclockwise around the point O while a length of the straight line is gradually increased in plan view; and a center determination mark disposed outside of the light flux control surface and on a circle around the point O in plan view.

A metal mold according to an embodiment of the present invention is configured to mold a light flux controlling member, the metal mold including: a light flux control surface molding part configured to mold a light flux control surface including an outer edge with a shape that is drawn by a point A when a straight line connecting a point O and the point A is rotated 360 degrees or more clockwise or counterclockwise around the point O while a length of the straight line is gradually increased in plan view; and a center determination mark molding part configured to mold a center determination mark disposed outside of the light flux control surface molding part and on a circle around the point O in plan view.

Advantageous Effects of Invention

According to the embodiment of the present invention, it is possible to provide a light flux controlling member that can determine the center of a lens surface (light flux control surface) that does not have a circular outer edge in plan view. In addition, it is possible to provide a metal mold that can mold the light flux controlling member.

DESCRIPTION OF EMBODIMENTS

An embodiment of the present invention is elaborated below with reference to the accompanying drawings.

Light Flux Controlling Member

Figure 1A:
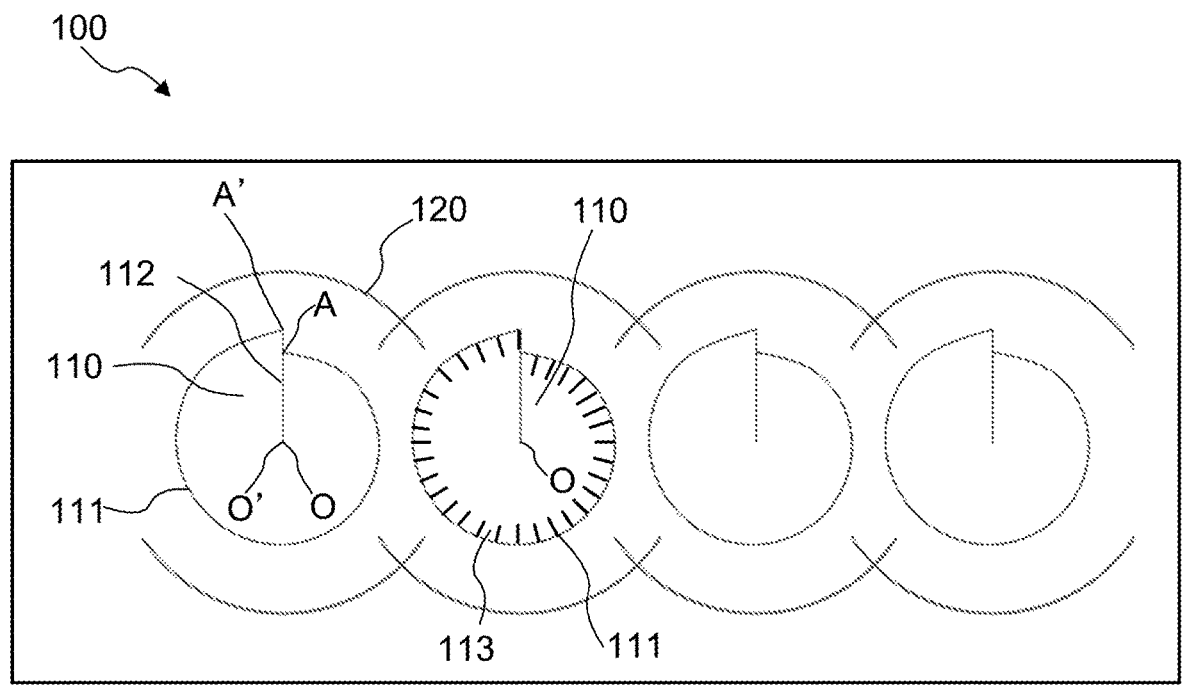
FIGS. 1A and 1B are plan views illustrating a light flux controlling member.
Figure 1B:
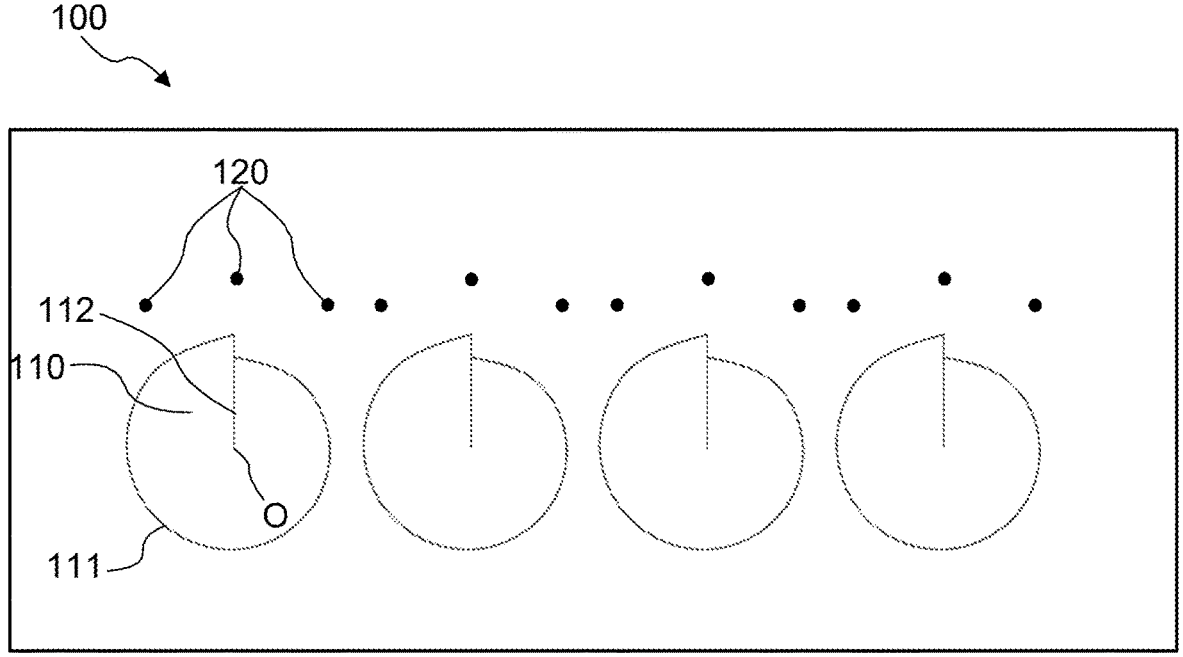

FIGS. 1A and 1B are plan views of light flux controlling member 100. As illustrated in FIG. 1A, in the present embodiment, light flux controlling member 100 is a lens array provided with a plurality of (four) light flux control surfaces 110. In addition, light flux controlling member 100 includes, in a surface on the side opposite to the side on which the plurality of light flux control surfaces 110 is disposed, optical surfaces corresponding to the plurality of light flux control surfaces 110. In the present embodiment, the optical surface is a flat surface. For example, the distribution of light entered from the optical surface is controlled by being emitted from light flux control surface 110.

In the present embodiment, light flux control surfaces 110 are disposed at even intervals. Each of the plurality of light flux control surfaces 110 includes center determination mark 120 outside light flux control surface 110. Center determination mark 120 is a mark for determining point O, which is the center point of light flux control surface 110. Note that in light flux controlling member 100, only one light flux control surface 110 may be provided, and in this case, one center determination mark 120 is provided. Light flux control surface 110 of light flux controlling member 100 converts light with Gaussian distribution into ring-shaped light. In addition, light flux control surface 110 can suppress a situation where light emitted from the light-emitting element (such as VCSEL) or the optical transmission member is returned to the light-emitting element or the optical transmission member in the optical receptacle, for example.

Light flux control surface 110 and center determination mark 120 are described below.

Light flux control surface 110 is a surface for controlling light emitted from the light source. In the present embodiment, light flux control surface 110 includes outer edge 111 with a shape that is drawn by point A when a straight line connecting point O and point A (hereinafter referred to also as line OA) is rotated clockwise 360 degrees around point O while the length of the line OA is gradually increased in plan view as illustrated in FIG. 1A. Note that the rotation direction may be counterclockwise. In addition, the rotation may be made 360 degrees or more.

In addition, in the present embodiment, each point on line OA is a vortex surface with a spiral shape that becomes higher in the direction from the depth side toward the near side in FIG. 1A as it rotates. The spiral shape may become higher continuously or discontinuously (stepwise). Such a vortex surface can convert light with Gaussian distribution from the optical transmission member into ring-shaped light in the optical receptacle, for example.

When point O and point A after it is rotated 360 degrees while spiraling higher and higher are represented by point O' and point A', respectively as illustrated in FIG. 1A, point O' and point A' are located at higher positions than point O and point A (point O and point O' coincide with each other in plan view). In this manner, as viewed in cross section, the line extending along line OA and the line extending along O'A' have different heights, and step 112 is formed. Step 112 extends from the center (point O) of light flux control surface 110 to outer edge 111. The number and the height of step 112 is appropriately set in accordance with the phase difference to be provided to light passing through the vortex surface. In the present embodiment, one step 112 is provided, and step 112 has a height of 8 μm. Note that light flux control surface 110 may be a projecting surface projecting from the surrounding flat surface around light flux control surface 110, or a recessed surface recessed from the surrounding flat surface. In the present embodiment, light flux control surface 110 is a projecting surface.

In addition, as illustrated in second light flux control surface 110 from left in FIG. 1A, light flux control surface 110 may include a plurality of ridges 113. Ridges 113 is formed by transferring a plurality of grooves 213 of light flux control surface molding part 210 of metal mold 200 for molding light flux controlling member 100 described later. Ridges 113 are radially disposed around point O in a manner corresponding to grooves 213 such that the closer to point O, the lower.

Center determination mark 120 is a mark for determining point O (point O'). In the case where the outer edge of light flux control surface 110 has a circular shape, point O can be determined based on the outer edge even without the center determination mark. However, since outer edge III of light flux control surface 110 does not have a circular shape as described above in the present invention, point O is determined with center determination mark 120 provided in light flux controlling member 100. Point O is used for correctly measuring and managing the positional accuracy of the plurality of light flux control surfaces 110 in the lens array, for example.

In plan view, center determination mark 120 is not limited as long as it is disposed outside light flux control surface 110 and on a circle around point O, and the circle around point O can be determined. When the circle around point O can be determined from center determination mark 120, point O can be determined from the circle. In addition, center determination mark 120 may be formed as a protrusion or a recess.

In the example illustrated in FIG. 1A, center determination mark 120 is an arc around point O. One or a plurality of center determination marks 120 in the form of arc may be provided. In the present embodiment, a plurality of (two) center determination marks 120 in the form of arc are provided so as to face each other with point O disposed therebetween. The length of the arc is not limited. In the present embodiment, the length of the arc is set such that two arcs corresponding to light flux control surfaces 110 adjacent to each other overlap and cross each other.

In the example illustrated in FIG. 1B, center determination mark 120 is a point. Preferably, in the case where center determination mark 120 is a point, the center determination mark disposed on the circle around point O is three points on the circle with which point O as the center of the circle can be determined. While three arbitrary points are required in order to determine the circle around point O from the points, the number of points is not limited to three as long as at least three points are provided. At least three points are not limited and may be disposed in any manner as long as they are disposed on the circle around point O.

The material of the light flux controlling member is appropriately selected from materials that are optically transparent to the light to be used. Examples of the material of the light flux controlling member include polymethylmethacrylate (PMMA), polycarbonate (PC), epoxy resin (EP), modified polyphenylenether (m-PPE), cycloolefin polymer (COP), and cyclic olefin copolymer (COC).

Metal Mold

Figure 2A:
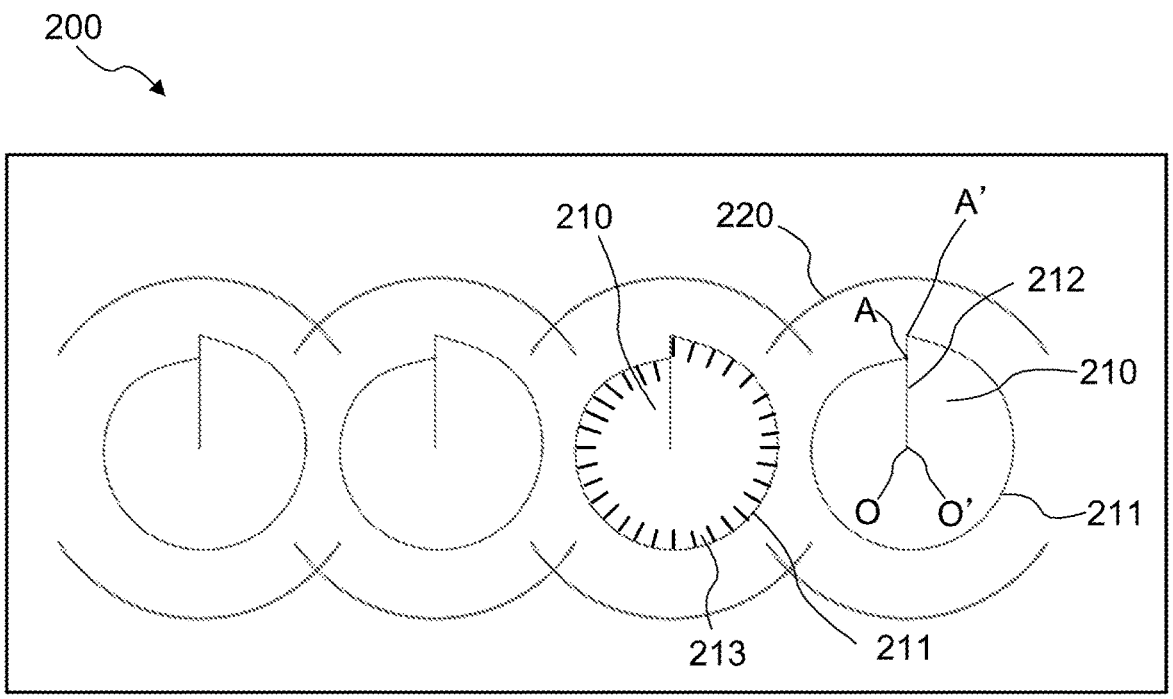
FIGS. 2A and 2B are plan views illustrating a metal mold of the light flux controlling member.
Figure 2B:
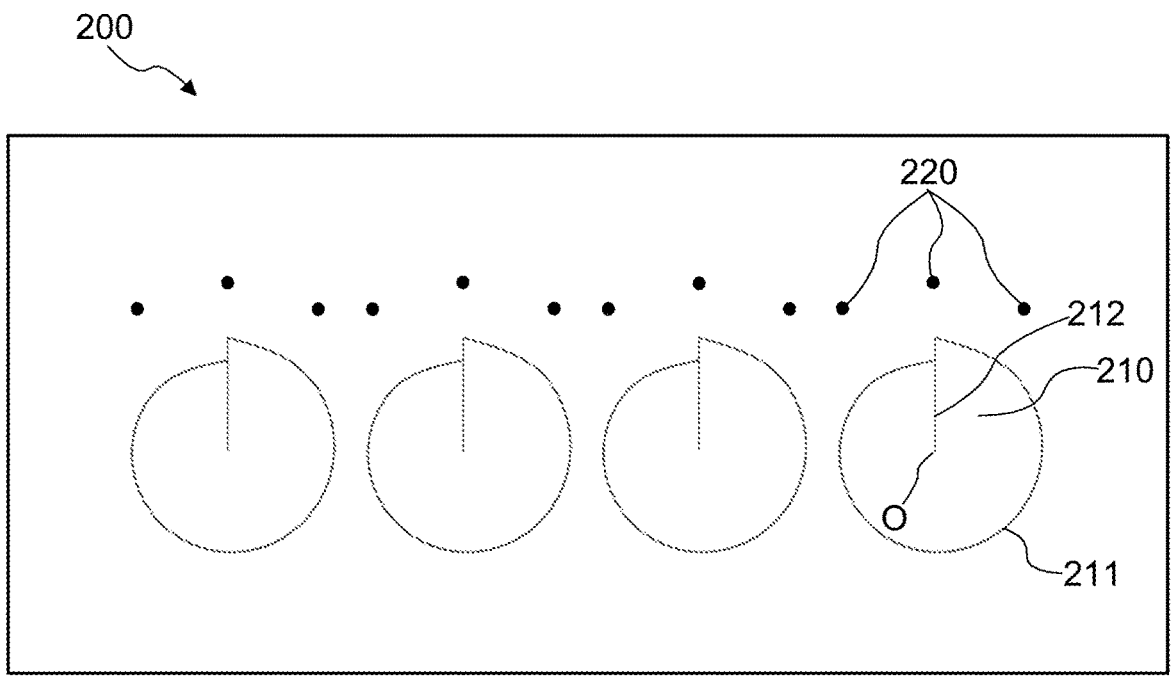

FIGS. 2A and 2B are plan views of metal mold 200 for molding light flux controlling member 100. Metal mold 200 need only have a shape complementary to light flux controlling member 100 such that light flux controlling member 100 can be formed. Metal mold 200 is used as an upper mold or a lower mold for forming a cavity.

Metal mold 200 includes a plurality of (four) light flux control surface molding parts 210. In metal mold 200, a plurality of light flux control surface molding parts 210 are disposed at even intervals. In addition, in metal mold 200, each of the plurality of light flux control surfaces 110 includes center determination mark molding part 220. Light flux control surface molding part 210 and center determination mark molding part 220 are described below.

Light flux control surface molding part 210 is a part for molding light flux control surface 110. In the present embodiment, in plan view as illustrated in FIG. 2A, light flux control surface molding part 210 includes outer edge 211 with a shape that is drawn by point A when a straight line connecting point O and point A (hereinafter referred to also as line OA) is rotated counterclockwise 360 degrees around point O while gradually increasing its length. Note that the rotation direction may be clockwise. In addition, the rotation may be made 360 degrees or more.

In addition, in light flux control surface molding part 210 of the present embodiment, each point on line OA is a vortex shaping surface with a spiral shape that becomes lower in the direction from the near side toward the depth side in FIG. 2A as it rotates. Note that the spiral shape may become lower continuously or discontinuously (stepwise).

When point O and point A after it is rotated 360 degrees while spiraling lower and lower are represented by point O' and point A', respectively as illustrated in FIG. 2A, point O' and point A' are located at lower positions than point O and point A (point O and point O' coincide with each other in plan view). In this manner, as viewed in cross section, the line extending along line OA and the line extending along O'A' have different heights, and step 212 is formed. Step 212 extends from the center (point O) of light flux control surface molding part 210 to outer edge 211. The number and the height of step 212 are appropriately set in accordance with the vortex surface to be formed. In the present embodiment, one step 212 is provided, and step 212 has a height of 8 μm. Note that light flux control surface molding part 210 may be a recessed surface or a projecting surface complementary to light flux control surface 110. In the present embodiment, light flux control surface molding part 210 is a recessed surface.

In addition, as illustrated in second light flux control surface molding part 210 from right in FIG. 2A, light flux control surface molding part 210 may include a plurality of grooves 213. Grooves 213 are formed as light flux control surface molding part 210 is cut with a cutting tool from outer edge 211 toward point O, and grooves 213 are radially disposed around point O such that the closer to point O, the shallower.

Center determination mark molding part 220 is a part for molding center determination mark 120. In addition, center determination mark molding part 220 may be used for determining point O in metal mold 200.

In plan view, center determination mark molding part 220 is not limited as long as it is disposed outside light flux control surface molding part 210 and on the circle around point O, and the circle around point O can be determined. Center determination mark molding part 220 may be formed as a protrusion or a recess.

In the example illustrated in FIG. 2A, center determination mark molding part 220 is an arc around point O. One or a plurality of center determination mark molding parts 220 in the form of arc may be provided. In the present embodiment, a plurality of (two) center determination mark molding parts 220 are disposed to face each other with point O therebetween. The length of the arc is not limited. In the present embodiment, the length of the arc is set such that two arcs corresponding to adjacent two light flux control surfaces 110 overlap and cross each other.

In the example illustrated in FIG. 2B, center determination mark molding part 220 is a point. Preferably, in the case where center determination mark molding part 220 is a point, the center determination mark disposed on the circle around point O is three arbitrary points on the circle with which the point O as the center of the circle can be determined. While three arbitrary points are required in order to determine the circle around point O from the points, the number of points is not limited to three as long as at least three points are provided. The at least three points are not limited and may be disposed in any manner as long as they are disposed on the circle around point O.

The material of the metal mold is not limited, and may be appropriately selected from publicly known materials. Examples of the material of the metal mold include steel material, zinc alloy, and aluminum alloy, and preferably, the material contains steel material from a view point of durability.

Effect

According to the present embodiment, even when light flux control surface 110 does not have a circular shape in plan view, the center of light flux control surface 110 can be determined from the center determination mark. Thus, it is easy to dispose light flux control surface 110 at a correct position.

INDUSTRIAL APPLICABILITY

According to the present invention, the center of a light flux control surface that does not have a circular shape can be determined. The light flux controlling member of the embodiment of the present invention is suitable for optical communications and the like, for example.

REFERENCE SIGNS LIST

100 Light flux controlling member
110 Light flux control surface
111, 211 Outer edge
112, 212 Step
113 Ridge
120 Center determination mark
200 Metal mold
210 Light flux control surface molding part
213 Groove
220 Center determination mark molding part

The invention claimed is:

1. A light flux controlling member, comprising:
   a light flux control surface including an outer edge with a shape that is drawn by a point A when a straight line connecting a point O and the point A is rotated 360 degrees or more clockwise or counterclockwise around the point O while a length of the straight line is gradually increased in plan view; and
   a center determination mark disposed outside of the light flux control surface and on a circle around the point O in plan view.

2. The light flux controlling member according to claim 1, wherein the center determination mark disposed on the circle around the point O includes three arbitrary points on the circle configured to determine the point O, the point O being a center of the circle.

3. The light flux controlling member according to claim 1, wherein the center determination mark includes an arc.

4. The light flux controlling member according to claim 3, wherein the center determination mark includes two arcs disposed to face each other with the point O sandwiched between the two arcs.

5. The light flux controlling member according to claim 1, wherein the light flux control surface includes a vortex surface with a continuous or stepwise spiral shape.

6. The light flux controlling member according to claim 1, wherein the light flux control surface is a projecting surface.

7. The light flux controlling member according to claim 1, further comprising:
- a plurality of the light flux control surfaces; and
- a plurality of the center determination marks corresponding to each of the plurality of light flux control surfaces.

8. A metal mold configured to mold a light flux controlling member, the metal mold comprising:
- a light flux control surface molding part configured to mold a light flux control surface including an outer edge with a shape that is drawn by a point A when a straight line connecting a point O and the point A is rotated 360 degrees or more clockwise or counterclockwise around the point O while a length of the straight line is gradually increased in plan view; and
- a center determination mark molding part configured to mold a center determination mark disposed outside of the light flux control surface molding part and on a circle around the point O in plan view.

9. The metal mold according to claim 8,
wherein the light flux control surface molding part includes a vortex shaping surface with a continuous or stepwise spiral shape; and
wherein a plurality of grooves is disposed in the vortex shaping surface, the plurality of grooves being radially disposed around the point O such that the closer to the point O, the shallower.

* * * * *